(12) United States Patent
Guajardo et al.

(10) Patent No.: US 12,537,003 B2
(45) Date of Patent: Jan. 27, 2026

(54) CONTEXT AWARE NOTIFICATIONS

(71) Applicant: Google LLC, Mountain View, CA (US)

(72) Inventors: Jaime Guajardo, Austin, TX (US);
Gabriella Lanning, Austin, TX (US);
Dmitrii Boiarshinov, Round Rock, TX (US)

(73) Assignee: Google LLC, Mountain View, CA (US)

( * ) Notice: Subject to any disclaimer, the term of this patent is extended or adjusted under 35 U.S.C. 154(b) by 208 days.

(21) Appl. No.: 18/481,979

(22) Filed: Oct. 5, 2023

(65) Prior Publication Data

US 2025/0118299 A1    Apr. 10, 2025

(51) Int. Cl.
*G10L 15/22*      (2006.01)
*G06F 40/20*      (2020.01)

(52) U.S. Cl.
CPC .............. *G10L 15/22* (2013.01); *G06F 40/20* (2020.01); *G10L 2015/223* (2013.01)

(58) Field of Classification Search
USPC .............................................. 704/7–10, 257
See application file for complete search history.

(56) References Cited

U.S. PATENT DOCUMENTS

| | | | | |
|---|---|---|---|---|
| 8,823,507 | B1* | 9/2014 | Touloumtzis | H04L 67/55 709/224 |
| 12,080,268 | B1* | 9/2024 | Nadig | G10L 13/00 |
| 12,327,551 | B1* | 6/2025 | Chen | G10L 15/1815 |
| 2011/0106436 | A1* | 5/2011 | Bill | G01C 21/3407 701/467 |
| 2016/0261931 | A1* | 9/2016 | Fadell | G08C 17/02 |
| 2018/0046434 | A1 | 2/2018 | Noble et al. | |
| 2019/0341033 | A1 | 11/2019 | Hammons et al. | |
| 2022/0027703 | A1 | 1/2022 | Aggarwal | |

(Continued)

FOREIGN PATENT DOCUMENTS

| | | |
|---|---|---|
| WO | 2020226670 A1 | 11/2020 |
| WO | 2021154462 A1 | 8/2021 |
| WO | 2023091160 A1 | 5/2023 |

OTHER PUBLICATIONS

International Search Report and Written Opinion issued in related PCT Application No. PCT/US2024/048488, dated Dec. 20, 2024.

*Primary Examiner* — Leonard Saint-Cyr
(74) *Attorney, Agent, or Firm* — Honigman LLP; Brett A. Krueger; Grant Griffith

(57) ABSTRACT

A computer-implemented method includes receiving a natural language command from a user that requests a digital assistant to provide a notification to a user device associated with the user upon occurrence of a particular event. The method also includes processing the natural language command using a natural language understanding module to determine one or more event conditions that each indicate the occurrence of the particular event and obtaining event information of the particular event. While the user device is in a notification silencing mode, the method includes determining that at least one of the one or more event conditions is satisfied and providing the notification for output from the user device in response to determining that at least one of the one or more event conditions is satisfied. The notification, when output from the user device, notifies the user of the occurrence of the particular event.

18 Claims, 5 Drawing Sheets

(56) References Cited

U.S. PATENT DOCUMENTS

| | | | |
|---|---|---|---|
| 2022/0179665 A1* | 6/2022 | Rathod | G06F 9/451 |
| 2023/0056988 A1 | 2/2023 | Welch et al. | |
| 2023/0164106 A1 | 5/2023 | Greenberg et al. | |
| 2025/0173781 A1* | 5/2025 | Rhodes | G06Q 40/00 |

* cited by examiner

CONTEXT AWARE NOTIFICATIONS

TECHNICAL FIELD

This disclosure relates to context aware notifications.

BACKGROUND

User devices are capable of executing multiple applications each of which may generate notifications about certain events occurring. Oftentimes, the amount of notifications generated by the multiple applications executing on the user device becomes overwhelming for users. As such, user devices are configurable in order to manage the notifications presented to the user. For instance, a user may configure the user device to silence all notifications generated by any application or only silence notifications generated by particular applications. However, notification configuration settings of the user device can be quite complex such that the user is unable to accurately silence notifications the user wants to ignore and allow notifications the user wants to be alerted of. In some scenarios, the user may inadvertently silence an important notification the user wished to be notified of thereby to a poor user experience with the user device.

SUMMARY

One aspect of the disclosure provides a computer-implemented method that when executed on data processing hardware causes the data processing hardware to perform operations for generating context aware notifications. The operations include receiving a natural language command from a user that requests a digital assistant to provide a notification to a user device associated with the user upon occurrence of a particular event. The operations also include processing the natural language command using a natural language understanding (NLU) module to determine one or more event conditions that each indicate the occurrence of the particular event. The operations also include obtaining event information associated with the particular event. While the user device is in a notification silencing mode, the operations include determining that at least one of the one or more event conditions is satisfied based on the event information and providing the notification for output from the user device in response to determining that at least one of the one or more event conditions is satisfied. The notification, when output from the user device, notifies the user of the occurrence of the particular event.

Implementations of the disclosure may include one or more of the following optional features. In some implementations, obtaining the event information associated with the particular event includes obtaining the event information from the user device. The event information may include multi-modal information. In some examples, the operations further include determining that the user has not received the notification output from the user device after a threshold amount of time and providing the notification for output from one or more other user devices associated with the user in response to determining that the user has not received the notification output from the user device after the threshold amount of time. Here, the notification when output from the one or more other user devices associated with the user, notifying the user of the occurrence of the particular event.

In some implementations, the operations further include determining that the natural language command does not include particular notification information and, based on determining that the natural language command does not include the particular notification information, issuing a user prompt soliciting the user to provide another natural language command specifying the particular notification information and receiving another natural language command specifying the particular notification information. In these implementations, the operations also include supplementing the natural language command with the particular notification information. The natural language command may include a spoken utterance or a textual input. In some examples, the NLU module includes a trained machine learning model.

The operations may further include identifying one or more applications associated with the particular event. Here, obtaining the event information associated with the particular event includes obtaining the event information from the one or more applications. In some implementations, the notification silencing mode includes at least one of a do not disturb mode configured to silence all notifications received by the user device, a flip to silence mode configured to silence all notifications received by the user device when the user device is in a face-down position, or a focus mode configured to allow one or more predetermined notifications and silence all other notifications received by the user device.

Another aspect of the disclosure provides a system that includes data processing hardware and memory hardware storing instructions that when executed on the data processing hardware causes the data processing hardware to perform operations. The operations include receiving a natural language command from a user that requests a digital assistant to provide a notification to a user device associated with the user upon occurrence of a particular event. The operations also include processing the natural language command using a natural language understanding (NLU) module to determine one or more event conditions that each indicate the occurrence of the particular event. The operations also include obtaining event information associated with the particular event. While the user device is in a notification silencing mode, the operations include determining that at least one of the one or more event conditions is satisfied based on the event information and providing the notification for output from the user device in response to determining that at least one of the one or more event conditions is satisfied. The notification, when output from the user device, notifies the user of the occurrence of the particular event.

Implementations of the disclosure may include one or more of the following optional features. In some implementations, obtaining the event information associated with the particular event includes obtaining the event information from the user device. The event information may include multi-modal information. In some examples, the operations further include determining that the user has not received the notification output from the user device after a threshold amount of time and providing the notification for output from one or more other user devices associated with the user in response to determining that the user has not received the notification output from the user device after the threshold amount of time. Here, the notification when output from the one or more other user devices associated with the user, notifying the user of the occurrence of the particular event.

In some implementations, the operations further include determining that the natural language command does not include particular notification information and, based on determining that the natural language command does not include the particular notification information, issuing a user prompt soliciting the user to provide another natural language command specifying the particular notification information and receiving another natural language command specifying the particular notification information. In these implementations, the operations also include supplementing the natural language command with the particular notification information. The natural language command may include a spoken utterance or a textual input. In some examples, the NLU module includes a trained machine learning model.

The operations may further include identifying one or more applications associated with the particular event. Here, obtaining the event information associated with the particular event includes obtaining the event information from the one or more applications. In some implementations, the notification silencing mode includes at least one of a do not disturb mode configured to silence all notifications received by the user device, a flip to silence mode configured to silence all notifications received by the user device when the user device is in a face-down position, or a focus mode configured to allow one or more predetermined notifications and silence all other notifications received by the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
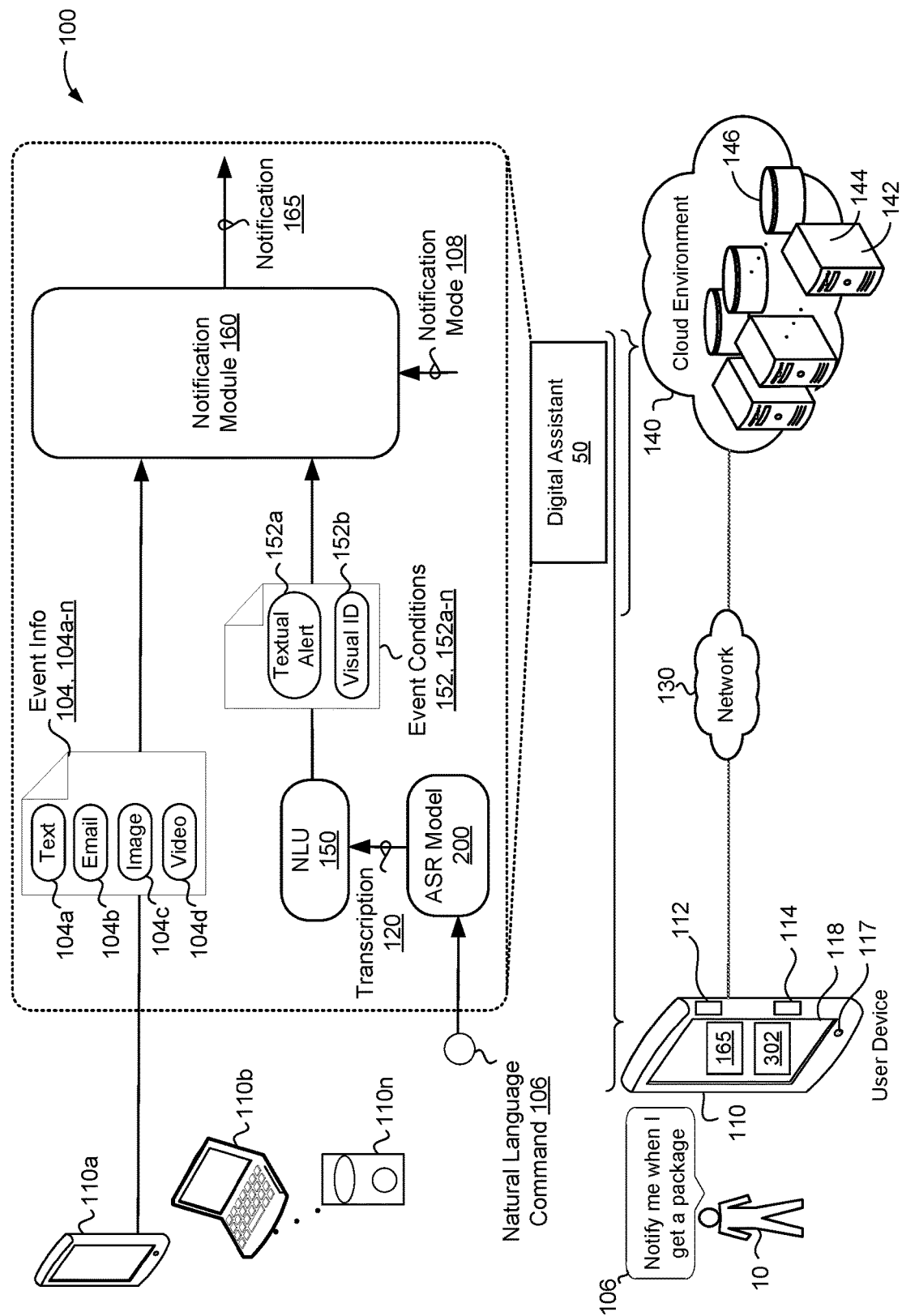
FIG. 1 is a schematic view of a user interacting with an example context aware system.

Assistant-enabled devices are increasingly connected with various different applications and various other devices. As such, users of these devices are inundated with notifications from each of the various different applications and other devices associated with the assistant-enabled device. To combat the increasing number of notifications, current approaches offer notification settings that allow users to configure what notifications are silenced and what notifications are provided as output for the user. For example, the user may specify that notifications from particular contacts, applications, or events can be provided as output while all other notifications are silenced. Yet, there are numerous notification settings such that it is easy for a user misconfigure the notification settings whereby the user is notified of notifications the user does not wish to be notified of or the user is not notified of notifications the user wishes to be notified of. This problem is further complicated when the user has a one-off event to be notified of which requires the user to configure and then re-configure the notification settings or when the user is awaiting an important or time-sensitive notification.

For instance, the user may encounter an example scenario where they are waiting for an important package to be delivered to their home that will not be delivered unless the user signs for the package. To be alerted when delivery personal rings the user's doorbell so that the package can be signed, the user may proactively turn the notification settings on the user device to allow notifications from a smart doorbell application to alert the user when the doorbell is rung. Thereafter, the user may continue working throughout the day waiting for the user device to provide a notification output notifying the user when someone arrives at the door. However, at the end of the day, the user device did not notify the user when the delivery person arrived at the door because the user device automatically enabled a do not disturb mode that silences all notifications received while the user device is in the do not disturb mode. In this scenario, the user device silenced the notification from the smart doorbell app indicating that a package delivery person was at the door. As a result, the user must wait another day to receive the package because the user did not sign for the package.

The next day, the user configures the smart doorbell application to override the do not disturb mode. Thus, during the day, the user receives numerous notifications from the smart doorbell application as it detects random people walking in front of the doorbell outside. As such, the user does not notice the notification that the package delivery person arrived at the door again because of the flood of other notifications received. Consequently, the user still does not receive the package because the user did not sign for the package.

Accordingly, implementations herein are directed towards methods and systems of providing context aware notifications. In particular, a digital assistant may receive a natural language command from a user that requests the digital assistant to provide a notification to a user device upon occurrence of a particular event, e.g., when delivery personal has arrived at the user's home with the package in the above example. The digital assistant processes, using a natural language understanding (NLU) module, the natural language command to determine one or more event conditions each indicating the occurrence of the particular event. The digital assistant obtains event information associated with the particular event from the user device and other devices associated with the user. While the user device is in a notification silencing mode, the digital assistant determines that at least one of the event conditions is satisfied based on the obtained event information and provides the notification for output from the user device in response to determining that the at least one of the event conditions is satisfied. Here, the notification, when output from the user device, notifies the user of the occurrence of the particular event while the user device is in the notification silencing mode. Notably, the notification silencing mode would otherwise silence the notification of the particular event occurring in conventional systems.

Referring to FIG. 1 an example system 100 includes one or more user devices 110, 110a-n each associated with a user 10. Each user device 110 is in communication with a cloud computing environment (i.e., remote system) 140 via a network 130. In the example shown, the user device 110 corresponds to a smart phone (i.e., mobile device), however, the user device 110 can include other computing devices including, but not limited to, a tablet, smart display, smart doorbell, television, desktop/laptop, smart watch, smart appliance, smart glasses/headset, or vehicle infotainment device. The user device 110 includes data processing hardware 112 and memory hardware 114 storing instructions that when executed on the data processing hardware 112 cause the data processing hardware 112 to perform operations. The cloud computing environment 140 also includes data processing hardware 142 and memory hardware 144 that when executed on the data processing hardware 142 causes the data processing hardware 142 to perform operations.

The user device 110 and/or the cloud computing environment 140 executes a digital assistant 50 that the user 10 may interact with through speech, textual inputs, and/or other user input interactions. In particular, the user device 110 may execute, for display on a screen 118 of the user device 110, a graphical user interface (GUI) configured to capture user input interactions via any one of touch, gesture, gaze, and/or an input device (e.g., mouse, trackpad, stylist, or keyboard) for controlling functionality of the user device. For example, the user 10 may provide a textual input via the GUI. In some implementations, the user device 110 (or another device in communication with the user device 110) includes an audio capture device (e.g., microphone) for capturing and converting spoken utterances within the environment into electrical signals. Thus, the user 10 may speak a natural language command 106 that the user device 110 converts into an electrical signal (i.e., sequence of acoustic frames) for processing by the digital assistant 50. The digital assistant 50 includes a natural language understanding (NLU) module 150 and a notification module 160. As will become apparent, the digital assistant 50 is configured to provide notifications 165 for output from the user device 110 upon the occurrence of particular events while the user device 110 is in a notification silencing mode 108. The notification 165 may be visually output on the screen 118 of the user device 110 or audibly output from a speaker 117 of the user device 110. Moreover, the notification 165 may be output by one or more other devices 110 associated with the user 10. Discussed in greater detail below, each of the NLU module 150 and the notification module 160 may include a respective trained machine learning model.

In some examples, the digital assistant 50 receives the natural language command 106 captured by the user device 110 that requests the digital assistant 50 to provide the notification 165 to the user device 110 upon occurrence of a particular event. The particular event in the example shown corresponds to a package delivery event, however, the particular event is not so limited. For example, the particular event may include, but is not limited to, a reminder for a calendar event, a communication from a particular contact, a notification associated with a particular social media post, emergency notifications, and/or a notification from a particular application. The natural language command 106 may include a spoken utterance or a textual input. That is, the user 10 may speak the natural language command 106 and/or input (e.g., via the GUI) text conveying the natural language command 106 in addition to, or in lieu of, speaking. Notably, the natural language command 106 may be any freeform or unstructured command whereby the user 10 requests to be notified by the user device 110 upon the occurrence of the particular event. That is, in some examples, the natural language command 106 does not need to be a predetermined command that is stored in association with the particular event beforehand.

In the example shown, the user 10 speaks the natural language command 106 of "Notify me when I get a package." The digital assistant 50 may employ an automatic speech recognition (ASR) model 200 configured to receive, as input, the natural language command 106 and generate, as output, a transcription 120 corresponding to text representing the natural language command 106. That is, the user device 110 may convert the natural language command 106 into a sequence of acoustic frames that the ASR model 200 processes to generate the transcription 120.

Figure 2:
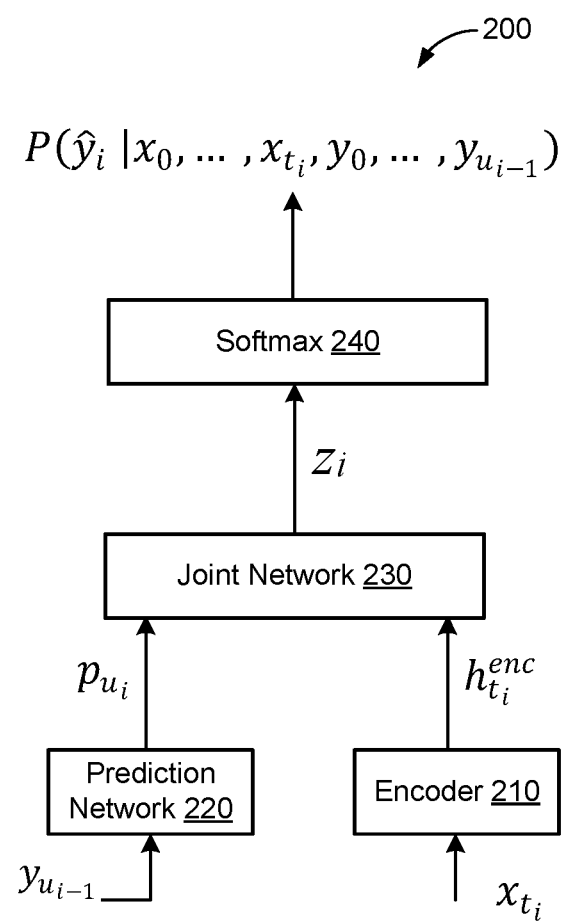
FIG. 2 is a schematic view of an example automatic speech recognition model.

Referring to FIG. 2, an example ASR model 200 may include a Recurrent Neural Network-Transducer (RNN-T) model architecture which adheres to latency constraints with interactive applications. The use of the RNN-T model architecture is exemplary only, as the ASR model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder network (e.g., audio encoder) 210 reads a sequence of d-dimensional feature vectors (e.g., acoustic frames corresponding to the natural language command 106 (FIG. 1)) $x=(x_1, x_2, \ldots, x_T)$, where $x_t \in \mathbb{R}^d$, and produces at each output step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation put. Together, the prediction network 220 and the joint network 230 may be referred to as a decoder that includes an RNN-T architecture. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network 230 then predicts $P(y_i|x_{t_i}, y_0, \ldots y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels.

Thus, if there are 100 different output labels representing different graphemes or other symbols, the output $z_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames, which allows the RNN-T model to be employed in the streaming fashion, the non-streaming fashion, or some combination thereof.

In some examples, the audio encoder (i.e., encoder) 210 of the RNN-T model includes a stack of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance 16 layers. Moreover, the encoder 210 may operate in the streaming fashion (e.g., the encoder 210 outputs initial higher-order feature representations as soon as they are generated), in the non-streaming fashion (e.g., the encoder 210 outputs subsequent higher-order feature representations by processing additional right-context to improve initial higher-order feature representations), or in a combination of both the streaming and the non-streaming fashion.

Referring again to FIG. 1, the digital assistant 50 includes the NLU module 150 configured to receive, as input, the transcription 120 generated by the ASR model 200 and generate, as output, one or more event conditions 152, 152a-n each indicating the occurrence of the particular event specified by the natural language command 106. In some configurations, the NLU module 150 is a trained large language model (LLM) configured to receive the natural language command 106 specifying the particular event and generate the one or more event conditions 152 that indicate the occurrence of the particular event. In some implementations, the natural language command 106 bypasses the ASR model 200 and is input directly to the NLU module 150. For example, when the natural language command 106 includes a textual input, the natural language command 106 is directly input to the NLU module 150. In another example, the digital assistant 50 may identify an action associated with a user input interaction via the user device 110. For instance, the digital assistant 50 may identify an action of creating a calendar event or an action of purchasing an item via a website and input an associated textual input corresponding to the identified action into the NLU module 150 as the natural language command 106.

Since the natural language command 106 may be any freeform command, the NLU module 150 is configured to understand the request natural language command 106. Thus, each respective event condition 152 generated by the NLU module 150 indicates that the particular event likely occurred when the respective event condition 152 is satisfied or otherwise occurs. In short, the NLU module 150 processes the transcription 120 corresponding to the natural language command 106 spoken by the user 10 to determine an intent or understanding of what was spoken by the user 10. In the example shown, the NLU module 150 determines that the intent of the user 10 is a request to be notified by the user device 110 when the particular event occurs (i.e., notified when the package arrives). Based on the determined intent or understanding of what was spoken by the user 10, the NLU module 150 generates the one or more event conditions 152 each indicating the occurrence of the particular event. Stated differently, the NLU module 150 generates the one or more event conditions 152 based on determining that, when any one or of the one or more event conditions 152 (or any combination of the event conditions 152) is satisfied, that the particular event that the user 10 specified in the natural language command 106 has likely occurred.

Continuing with the example shown, the NLU module 150 generates a first event condition 152a indicating a textual alert indicating that the package has arrived and a second event condition 152b indicating a visual identification (ID) of the package. Here, the NLU module 150 determines that the user 10 desires to be notified by the user device 110 when a package is delivered, and thus, generates event conditions 152 likely to indicate that the package has been delivered. In particular, NLU module 150 generates the first event condition 152a by determining that when text is received indicating that the package has arrived, the package has been delivered. Moreover, the NLU module 150 generated the second event condition 152b by determining that when the package is visually identified that the package has been delivered. Simply put, the NLU module 150 generates the event conditions 152 as conditions for the digital assistant 50 to monitor in order to detect whether the particular event has occurred. As such, after generating the one or more event conditions 152, the digital assistant 50 needs to determine whether at least one of the one or more event conditions 152 is satisfied.

To that end, the digital assistance 50 employs the notification module 160 configured to generate the notification 165 for the occurrence of the particular event specified by the natural language command 106. More specifically, the notification module 160 determines whether the particular event has occurred based on the one or more event conditions 152 and event information 104. That is, the notification module 160 receives the one or more event conditions 152 generated by the NLU module 150 and obtains event information 104 associated with the particular event to determine whether at least one of the one or more event conditions 152 is satisfied. Simply put, the notification module 160 compares the obtained event information 104 with the one or more event conditions 152 to determine whether the particular event has occurred.

In some implementations, the notification module 160 obtains the event information 104 from the user device 110 that received the natural language command 106. In other implementations, the notification module obtains the event information from one or more other user devices 110 associated with the user 10 in addition to, or in lieu of, obtaining event information 104 from the user device 110 that received the natural language command 106. For instance, in the example shown, the notification module 160 receives event information 104 from a first user device 110a including a mobile device that received the natural language command 106, a second user device 110b including a laptop computer associated with the user 10, and a third user device 110n including a smart doorbell associated with the user 10.

However, it is understood that the notification module 160 may obtain the event information 104 from any type of user device 110 and from any number of user devices 110. In some examples, the notification module 160 identifies the user devices 110 associated with the user 10 to obtain the event information 104 from based on a user account of the user 10. That is, the notification module 160 identifies the user devices 110 associated with the user account of the user 10 that provided the natural language command 106. In other examples, the notification module 160 identifies the user device 110 based on identifying user devices 110 within a threshold proximity to the user device 110 that received the natural language command 106. In some implementations, the notification module 160 identifies one or more applications associated with the particular event and obtains event information 104 from the user devices 110 from the identified one or more applications. For instance, the notification module 160 may identify a smart doorbell application associated with the package delivery event such that the notification module 160 obtains notifications and data from the smart doorbell application of the user devices 110.

The event information 104 obtained from the user device 110 associated with the user 10 may include multi-modal event information. In particular, the multi-model event information may include video data, image data, acoustic data, textual data, location data, spatial data, or a combination thereof. Continuing with the example shown, the notification module 160 obtains first event information 104a including text messages, second event information 104b including email messages, third event information 104c including images, and fourth event information 104d including videos. Thus, the notification module 160 is capable of processing each modality of the input obtained from the user devices 110 to determine whether the particular event has occurred.

Thus, the notification module 160 compares the obtained event information 104 to the one or more event conditions 152 to determine whether the particular event has occurred. For instance, the notification module 160 may determine whether the first event condition 152a (i.e., textual alert) is satisfied based on the text event information 104a and the email event information 104b. Here, the notification module 160 may parse text messages and emails obtained from any user device 110 associated with the user 10. That is, the notification module 160 may employ natural language processing on the obtained text messages and emails to identify any text indicating that the package has arrived for the user 10. For example, the notification module 160 would recognize that a text message stating "Your package is out for delivery" means that the package has not yet been delivered, but that an email stating "Your order has been delivered" means that the package has been delivered to the user 10. In this example, the notification module 160 would refrain from generating the notification 165 responsive to receiving the text message, but would generate the notification 165 in response to receiving the email. Notably, the user 10 gives express authorization for the notification module 160 to perform natural language processing on text obtained from personal email accounts and text messages, whereby the user may revoke authorization at any time.

Additionally or alternatively, the notification module 160 may determine whether the second event condition 152b (i.e., visual ID) is satisfied based on the image event information 104c and/or the video image data 104d. Here, the notification module 160 processes images and video captured by the smart doorbell to determine whether a package has been visually identified. In particular, the smart doorbell and/or the notification module 160 performs object detection to determine whether a package has been visually identified at a doorstep of a household of the user 10. Thus, the notification module 160 is capable of processing the image or video data captured by the smart doorbell or of receiving a notification generated by the smart doorbell. For example, the notification module 160 discerns that a video of a person simply ringing the smart doorbell does not indicate that the package has been delivered while an image of a delivery box likely indicates that the package has been delivered. In this example, the notification module 160 would refrain from generating the notification 165 responsive to receiving the video, but would generate the notification 165 in response to receiving the image.

In some implementations, the notification module 160 generates the notification 165 based on determining that a single event condition 152 from the one or more event conditions 152 is satisfied. In other implementations, the notification module 160 generates the notification 165 based on determining that a combination of the event conditions 152 from the one or more event conditions 152 is satisfied. In response to determining that at least one of the one or more event conditions 152 (or a combination of event conditions 152) is satisfied, the notification module 160 provides the notification 165 for output from the user device 110. On the other hand, in response to determining that at least one of the one or more event conditions 152 (or a combination of event conditions 152) fails to be satisfied, the notification module 160 does not (e.g., refrains from) providing the notification 165 for output from the user device 110.

Notably, the notification module 160 determines that the at least one of the one or more event conditions 152 is satisfied and provides the notification 165 for output from the user device 110 while the user device is in the notification silencing mode 108. Here, the notification silencing mode 108 of the user device 110 is configured to silence notifications received by the user device 110. As such, in a conventional system, the notification silencing mode 108 would silence all notifications received by the user device 110 including, for example, the email indicating that the package has been delivered and/or the image identifying the package such that the user 10 would not be notified by the user device 110 that the package has been delivered. Advantageously, in contrast to the conventional system, the digital assistant 50 provides the notification 165 as output from the user device 110 based on receiving the natural language command 106 from the user 10 despite the user device 110 being in the notification silencing mode 108. The notification silencing mode 108 may include at least one of a do not disturb mode, a flip to silence mode, or a focus mode. The notification silencing mode 108 is configurable by the user 10 such that the user 10 may provide input at a button of the user device 110, the screen 118 of the user device, and/or voice input to the user device 110 indicating the notification silencing mode 108.

In some examples, while the user device 110 is in the do not disturb mode, the user device 110 silences all notifications received by the user device 110. For instance, the user device 110 does not provide any output notifying the user 10 of received phone calls, text messages, emails, social media notifications, etc. that the user device 110 receives while in the do not disturb mode. In another example, while the user device 110 is in the flip to silence mode (i.e., a "flip to shh" mode), the user device 110 silences all notifications received by the user device when the user device is in in a face-down position, but the user device 110 provides all notifications received by the user device 110 when the user device is not in the face-down position. Here, the face-down position refers to the screen 118 of the user device 110 being placed face-down against any suitable surface. For instance, the user device 110 is in the face-down position when the screen 118 of the user is face-down against a desk. Thus, the user device 110 does not provide any output notifying the user 10 of received phone calls, text messages, emails, social media notifications, etc. that the user device 110 receives while in the flip to silence mode and is in the face-down position. On the other hand, the user device 110 provides notifications that notify the user of any received phone calls, text messages, emails, social media notifications, etc. that the user device 110 receives while in the flip to silence mode and is in any position other than the face-down position. In yet another example, while the user device 110 is in the focus mode, the user device 110 allows one or more predetermined notifications to be output by the user device 110, but silences all other notifications received by the user device 110. For instance, the focus mode may specify that the user 10 wishes to be notified of any calls from their Mom or Dad, but to silence all other notifications. Here, the user device 110 notifies the user of any calls received from Mom or Dad while in the focus mode, but does not provide any output notifying the user 10 of other received phone calls, text messages, emails, social media notifications, etc. that the user device 110 receives while in the focus mode.

However, configuring the notification silencing mode 108 to correctly allow certain notifications and silence other notifications is quite difficult to do correctly. Oftentimes, the user 10 configures the notification silencing mode 108 such that notifications the user 10 does not want to be notified of are still output from the user device 110 and/or notifications the users wants to be notified of are actually silenced by the user device 110. For example, the user 10 wishing to be notified of the package delivery may enable notifications from a texting application in anticipation of receiving a text message when the package has been delivered and silence all other notifications. However, in this example, the user 10 may not actually receive any text message when the package has been delivered, but receive image data from a smart doorbell indicating that the package has been delivered. Yet, because the user 10 silenced all other notifications, any notification from the smart doorbell about the package being delivered is silenced by the user device 110 such that the user 10 fails to be notified of the package delivery when it occurs. Moreover, in this example, the user 10 would receive multiple notifications for received emails that the user 10 does not wish to be notified, but never receive the notification from the smart doorbell indicating that the package has been delivered.

Thus, the notification module 160 generates the notification 165 despite the user device 110 being in the notification silencing mode 108 in response to the user 10 issuing the natural language command 106 and the at least one of the one or more event conditions 152 being satisfied. Advantageously, the user 10 does not need to manually configure notification settings or concern themselves with what notification silencing mode the user device 110 is in. Instead, the user 10 may simply provide the natural language command 106 specifying the particular event that the user 10 wishes to be notified of and the digital assistant 50 monitors event information 104 associated with the particular event and the generated event conditions 152 to detect whether the particular event has occurred or not. When the digital assistant 50 determines that the particular event has occurred based on the obtained event information 104 and the one or more event conditions 152, the digital assistant 50 provides the notification 165 for output from the user device 110 in the notification silencing mode 108. Again, in the conventional system, the notification of the particular event would be silenced by the user device 110 due to the notification silencing mode 108 while the digital assistant 50 provides the notification 165 as output from the user device 110 while the user device 110 remains in the notification silencing mode 108. Stated differently, based on the natural language command 106 input by the user 10, the digital assistant 50 is able to override the notification silencing mode 108 without the user 10 having to change any settings regarding notifications.

In some implementations, the digital assistant 50 determines the natural language command 106 does not include particular or sufficient notification information, or the notification information specified by the natural language command 106 is ambiguous. Thus, the digital assistant 50 may issue a user prompt 302 soliciting the user to provide the particular notification information or disambiguate one or more aspects of the notification information. As such, the digital assistant 50 may receive the notification information (or disambiguating information) from the user and supplement the natural language command with the particular notification information solicited by the digital assistant 50 when generating the one or more event conditions 152 or generating the notification 165. For example, the digital assistant 50 may issue the user prompt 302 of "would you like me to override your default notification settings?" or "would you like this notification to be output from your other devices if you do not acknowledge the notification?" to which the user 10 may respond "yes" or "no." However, generating the user prompt 302 is optional as the digital assistant 50 may determine the particular information without the user 10 providing another natural language command 106. In some examples, the user 10 may input the information solicited via another natural language command. In other examples, the prompt 302 may simply request the user to disambiguate between two or more options by providing a list of the options for the user to select from. In these examples, the prompt may convey the list of options via a graphical representation displayed on the screen 118 such that the user can select the graphical elements (e.g., check box) that represent the options the user 10 wants to input as the information solicited.

FIG. 1 contemplates a particular event associated with a package delivery and generating event conditions 152, and thus, obtaining event information 104 associated with the package delivery event. However, the digital assistant 50 may notify the user 10 of any particular event specified by the user 10 in the natural language command 106. For example, the natural language command 106 may include "Notify me of all emergency related notifications." In this example, the notification module 160 may parse received messages and contacts stored in a contact application to determine whether messages or notifications constitute an emergency related notification for the particular user 110. Moreover, the notification module 160 would provide a notification 165 as output from the user device 110 related to any weather, national, or local emergency received via text messages, emails, or other applications running on the user device 110. Here, the notification module 160 may determine an importance or a severity of obtained event information 104. For instance, the notification module 160 would determine that a notification from a carbon monoxide device indicating dangerous levels of carbon monoxide is severe enough to notify the user 10 such that the notification module 160 provides the notification 165 as output from the user device 110.

In another example, the natural language command 106 may be "notify me when someone says something nice about my dog on social media." Here, the notification module 160 would obtain data from social media applications related to the user account of the user 10 and determine whether any notifications include a nice or positive comment about the user's dog. In yet another example, the natural language command 106 may be "every month notify me about my favorite music artists who are coming into town." Here, the notification module 160 may determine favorite music artists associated with the user 10 based on music played by the user via music applications. Thereafter, the notification module 160 obtains schedules of the determined favorite music artists to determine whether any of the favorite artists have events within a threshold distance of the user 10.

Advantageously, the user 10 does not need to understand or configure the complex notification settings of the user device 110 to be notified upon the occurrence of particular events. Instead, the digital assistant 50 understands the particular event to notify the user 10 of and monitors event information 104 from multiple applications and devices to determine whether the particular event has occurred or not. Thus, the user 10 may simply input a freeform natural language command 106 requesting to be notified about a particular event occurring now, or in the future, and be notified of such event without having to worry about the notification being inadvertently silenced.

As discussed above, the NLU module 150 and the notification module 160 may each include a respective machine learning model. Thus, the NLU module 150 may include a LLM trained on labeled training data that includes training natural language commands/prompts paired with ground-truth event conditions. In some scenarios, the LLM may include a pre-trained LLM and prompt-tuning is employed to tune prompts in a manner that results in the LLM producing outputs that predict event conditions 152. In prompt-tuning, soft prompt embeddings are learned/tuned while parameters of the pre-trained LLM remained fixed, During training, the NLU module 150 learns how to predict event conditions that correctly indicate whether the particular event has occurred or not. Moreover, the notification module may be trained using labeled training data that includes training event conditions and training event information, including multi-modal information from multiple user devices, paired with ground-truth notifications (i.e., whether the particular event occurred or not). Training the notification module 160 teaches the notification module 160 to correctly identify whether the event condition is satisfied or not based on the obtained event information 104. In some implementations, the training data used to train the notification module 160 includes negative training data. For instance, the negative training data may include spam email or text messages that may seem to indicate a particular event has occurred when, actually, the paired ground-truth notification indicates that the particular event has not occurred. Thus, training the notification module 160 teaches the notification module 160 to discern misleading event information 104 that falsely indicates the particular event has occurred from event information 104 that correctly indicates the particular event has occurred.

Figure 3:
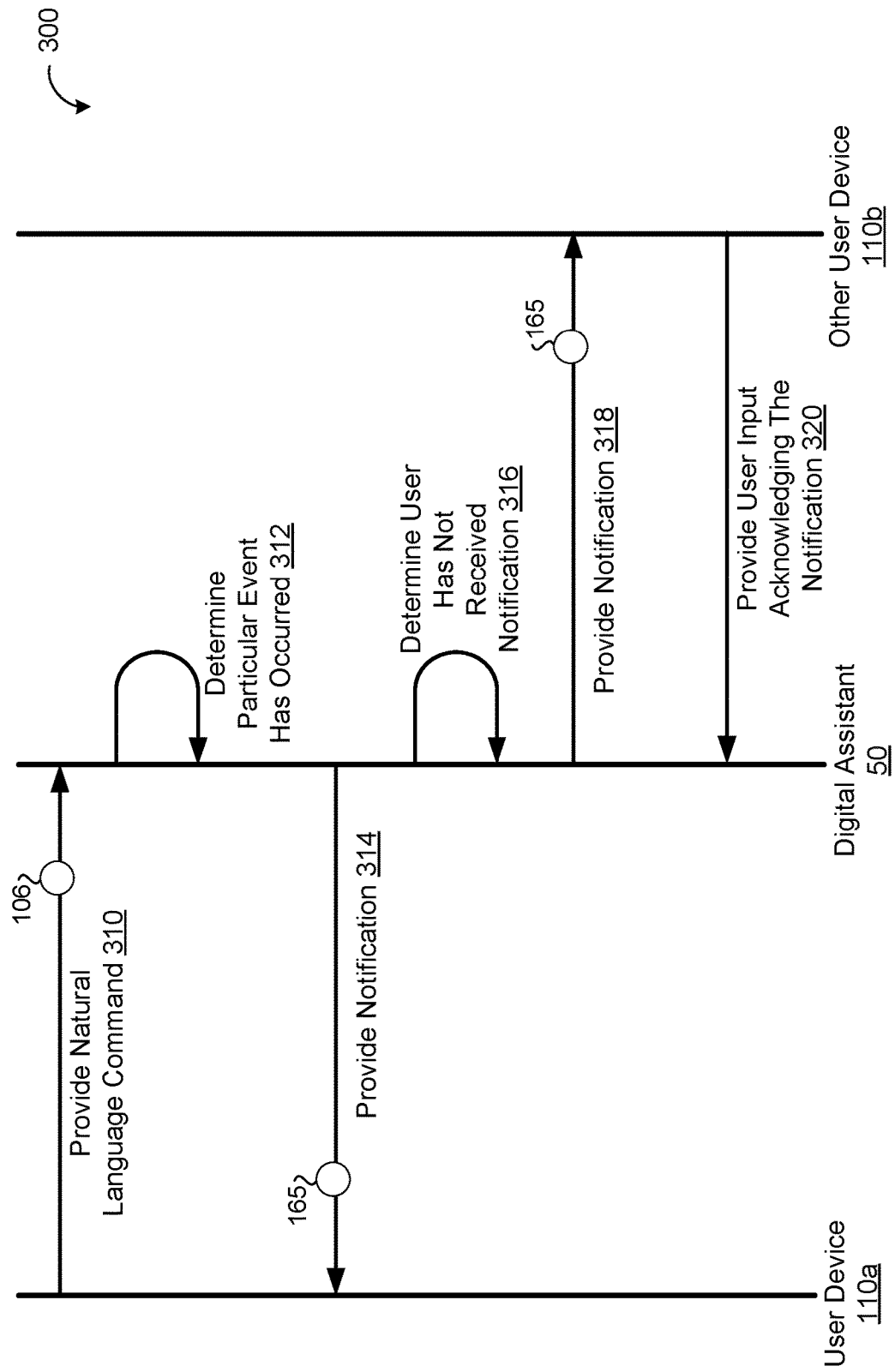
FIG. 3 is a schematic view of a sequence diagram for providing a notification as output from another user device.

FIG. 3 provides a sequence diagram 300 for steps to provide the notification 165 as output from other user devices 110 associated with the user. The steps begin at the top of the T-axis (i.e., the earliest point in time) and proceed in order down the Y-axis. The parallel vertical lines represent the first user device 110*a* that captures the natural language command 106 provided by the user 10, the digital assistant 50 executing on the first user device 110*a* and/or the cloud computing environment 140, and another user device 110*b* associated with the user 10, respectively. The other user device 110*b* may include multiple other user devices 110*b* associated with the user 110*b*.

At step 310, the first user device 110*a* provides the natural language command 106 captured from the user 10 specifying a particular event the user 10 wants to be notified of to the digital assistant 50. At step 312, the digital assistant 50 determines that the particular event has occurred. More specifically, the digital assistant 50 may determine that the particular event occurred based on one or more event conditions 152 and obtained event information 104. At step 314, based on determining that the particular event has occurred, the digital assistant 50 provides the notification 165 as output from the first user device 110*a* while the first user device 110*a* is in the notification silencing mode 108.

At step 316, the digital assistant 50 determines that the user 10 has not received the notification 165 output from the first user device 110*a* after a threshold amount of time. That is, the notification 165 may have been output from the first user device 110*a*, but the user 10 may not be near the first user device 110*a* such that the user 10 is unaware that the notification 165 is output from the first user device 110*a*. In some examples, the digital assistant 50 determines the user 10 has not received the notification 165 based on a lack of user input acknowledging the notification 165. At step 318, the digital assistant 50 provides the notification 165 indicating the occurrence of the particular event for output from the second user device 110*b* associated with the user 10 in response to determining that the user 10 has not received the notification output from the first user device 110*a* after the threshold amount of time. At step 320, the digital assistant 50 may receive a user input from the second user device 110*b* (or the first user device 110*a*) indicating that the user 10 has been notified of the notification 165. However, if the digital assistant 50 had not received the user input, the digital assistant 50 may continue outputting the notification 165 from other user devices 110 associated with the user 10 until the digital assistant receives user input indicating that the user 10 has been notified of the notification 165.

The notifications 165 output from the user device 110 include, but are not limited to, audible outputs, haptic outputs, graphical displays on the screen of the user device, voice calls received by the user device, and/or text messages received by the user device. In some examples, the user 10 may disable the request for the digital assistant 50 to provide the notification to the user device 110 upon the occurrence of a particular event. For instance, initially the user 10 may request to be notified of a package delivery by speaking "notify me when the package is delivered" such that the digital assistant 50 notifies the user 10 of the package delivery when it occurs. Here, the user 10 may only wish to be notified of the particular package delivery. As such, after the package delivery occurs and the user 10 is notified, the user 10 may disable the digital assistant 50 from notifying the user 10 of subsequent package deliveries the user 10 does not wish to be notified of by speaking "do not notify me of package deliveries anymore."

Figure 4:
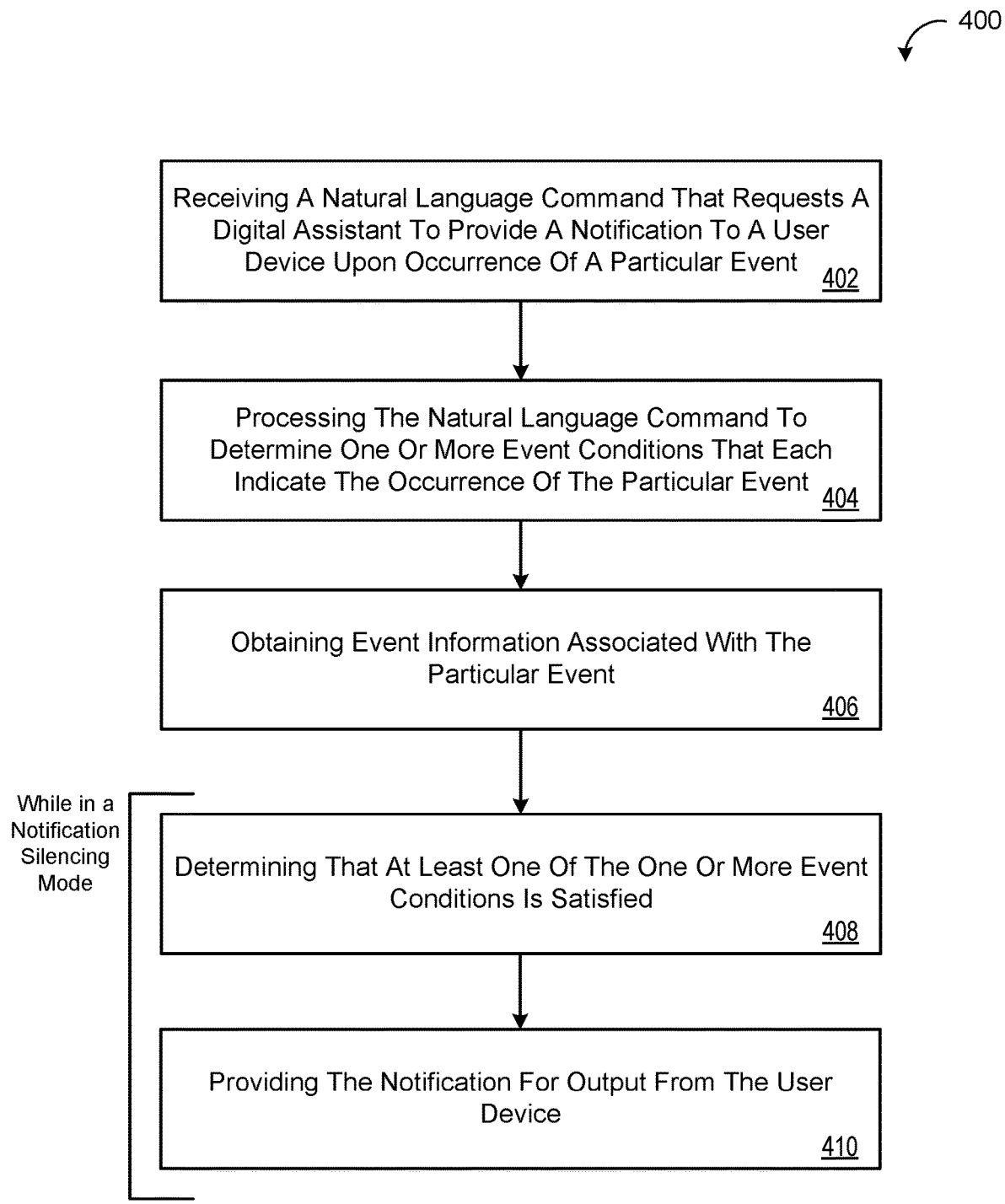
FIG. 4 is a flowchart of an example arrangement of operations for a computer-implemented method of providing context aware notifications.

FIG. 4 is a flowchart of an example arrangement of operations for a computer-implemented method 400 using context aware notifications. The method 400 may execute on data processing hardware 510 (FIG. 5) based on instructions stored on memory hardware 520 (FIG. 5) in communication with the data processing hardware 510. The data processing hardware 510 and the memory hardware 520 may reside on the user device 110 and/or the cloud computing environment 140 of FIG. 1 corresponding to a computing device 500 (FIG. 5).

At operation 402, the method 400 includes receiving a natural language command 106 from a user 10 that requests a digital assistant 50 to provide a notification 165 to a user device 110 associated with the user 10 upon occurrence of a particular event. At operation 404, the method 400 includes processing, using a NLU module 150, the natural language command 106 to determine one or more event conditions 152 that each indicate the occurrence of the particular event. At operation 406, the method 400 includes obtaining event information 104 associated with the particular event. While the user device is in a notification silencing mode 108, the method 400 performs operations 408 and 410. At operation 408, the method 400 includes determining that at least one of the one or more event conditions 152 is satisfied based on the event information 104. At operation 410, in response to determining that at least one of the one or more event conditions 152 is satisfied, the method 400 includes providing the notification 165 for output from the user device 110. The notification 165, when output from the user device 110, notifies the user 10 of the occurrence of the particular event.

Alternatively, the method 400 may perform operations 408 and 410 while the user device 110 is in a non-notification silencing mode 108 such that notifications 165 are output from the user device 110. Here, the method 400 determining that at least one of the one or more event conditions 152 is satisfied based on the event information 104. At operation 410, in response to determining that at least one of the one or more event conditions 152 is satisfied, the method 400 includes providing the notification 165 for output from the user device 110. Moreover, the method 400 includes determining that the user 10 has not been notified of the notification 165 despite being output from the user device 110 and, in response, outputs a stronger notification 165. Here, the stronger notification 165 may include an audible output and/or sending the notification 165 to another user device 110 associated with the user 10.

Figure 5:
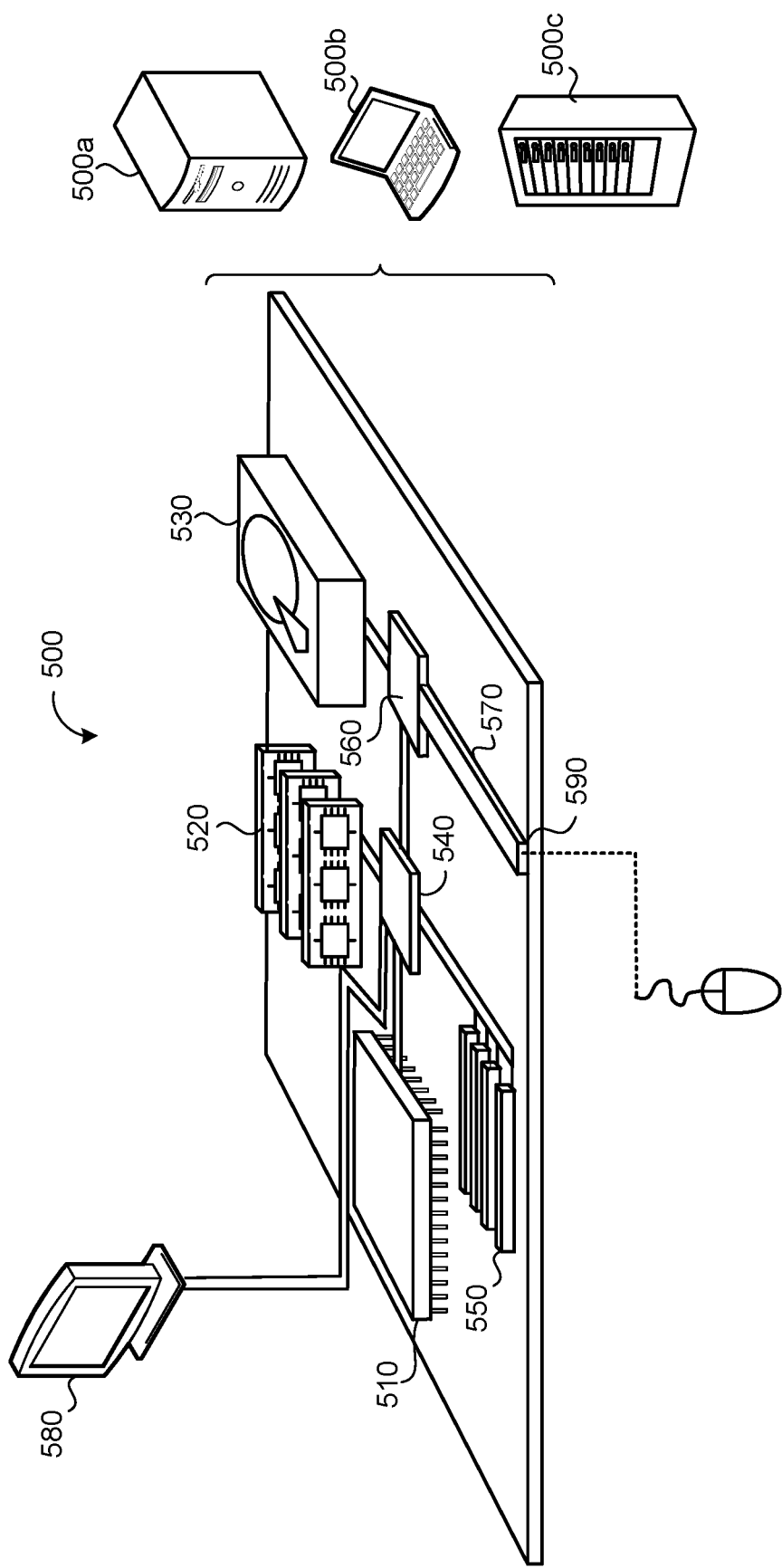
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array), an ASIC (application specific integrated circuit), or a graphics processing unit (GPU). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
   receiving a natural language command from a user that requests a digital assistant to provide a notification to a user device associated with the user upon occurrence of a particular event;
   processing, using a natural language understanding (NLU) module, the natural language command to determine multiple event conditions, each event condition of the multiple event conditions indicating the occurrence of the particular event;
   based on the multiple event conditions each determined to indicate the occurrence of the particular event, identifying multiple applications that are each:
      associated with at least one of the multiple event conditions; and
      executing on at least one of the user device or one or more other user devices associated with the user;
   obtaining, from the identified multiple applications that are each associated with at least one of the multiple event conditions and executing on at least one of the user device or the one or more other user devices associated with the user, event information associated with the particular event; and
   while the user device is in a notification silencing mode:
      determining, based on the event information, that at least one of the multiple event conditions is satisfied; and
      in response to determining that at least one of the multiple event conditions is satisfied, providing the notification for output from the user device, the notification, when output from the user device, notifying the user of the occurrence of the particular event.

2. The computer-implemented method of claim 1, wherein obtaining the event information associated with the particular event comprises obtaining the event information from the user device.

3. The computer-implemented method of claim 1, wherein obtaining the event information associated with the particular event comprises obtaining the event information from one or more other user devices associated with the user.

4. The computer-implemented method of claim 1, wherein the event information comprises multi-modal event information.

5. The computer-implemented method of claim 1, wherein the operations further comprise:
   determining that the user has not received the notification output from the user device after a threshold amount of time; and
   in response to determining that the user has not received the notification output from the user device after the threshold amount of time, providing the notification for output from one or more other user devices associated with the user, the notification, when output from the one or more other user devices associated with the user, notifying the user of the occurrence of the particular event.

6. The computer-implemented method of claim 1, wherein the operations further comprise:
determining that the natural language command does not include particular notification information;
based on determining that the natural language command does not include the particular notification information:
issuing a user prompt soliciting the user to provide the particular notification information; and
receiving the particular notification information from the user; and
supplementing the natural language command with the particular notification information.

7. The computer-implemented method of claim 1, wherein the natural language command comprises a spoken utterance or a textual input.

8. The computer-implemented method of claim 1, wherein the NLU module comprises a trained large language model.

9. The computer-implemented method of claim 1, wherein the notification silencing mode comprises at least one of:
a do not disturb mode configured to silence all notifications received by the user device;
a flip to silence mode configured to silence all notifications received by the user device when the user device is in a face-down position; or
a focus mode configured to allow one or more predetermined notifications and silence all other notifications received by the user device.

10. A system comprising:
data processing hardware; and
memory hardware in communication with the data processing hardware, the memory hardware storing instructions that when executed on the data processing hardware cause the data processing hardware to perform operations comprising:
receiving a natural language command from a user that requests a digital assistant to provide a notification to a user device associated with the user upon occurrence of a particular event;
processing, using a natural language understanding (NLU) module, the natural language command to determine multiple one or more event conditions, each event condition of the multiple event conditions indicating that each indicate the occurrence of the particular event;
based on the multiple event conditions each determined to indicate the occurrence of the particular event, identifying multiple applications that are each:
associated with at least one of the multiple event conditions; and
executing on at least one of the user device or one or more other user devices associated with the user;
obtaining, from the identified multiple applications that are each associated with at least one of the multiple event conditions and executing on at least one of the user device or the one or more other user devices associated with the user, event information associated with the particular event; and
while the user device is in a notification silencing mode:
determining, based on the event information, that at least one of the multiple one or more event conditions is satisfied; and
in response to determining that at least one of the multiple one or more event conditions is satisfied, providing the notification for output from the user device, the notification, when output from the user device, notifying the user of the occurrence of the particular event.

11. The system of claim 10, wherein obtaining the event information associated with the particular event comprises obtaining the event information from the user device.

12. The system of claim 10, wherein obtaining the event information associated with the particular event comprises obtaining the event information from one or more other user devices associated with the user.

13. The system of claim 10, wherein the event information comprises multi-modal event information.

14. The system of claim 10, wherein the operations further comprise:
determining that the user has not received the notification output from the user device after a threshold amount of time; and
in response to determining that the user has not received the notification output from the user device after the threshold amount of time, providing the notification for output from one or more other user devices associated with the user, the notification, when output from the one or more other user devices associated with the user, notifying the user of the occurrence of the particular event.

15. The system of claim 10, wherein the operations further comprise:
determining that the natural language command does not include particular notification information;
based on determining that the natural language command does not include the particular notification information:
issuing a user prompt soliciting the user to provide the particular notification information; and
receiving the particular notification information from the user; and
supplementing the natural language command with the particular notification information.

16. The system of claim 10, wherein the natural language command comprises a spoken utterance or a textual input.

17. The system of claim 10, wherein the NLU module comprises a trained large language model.

18. The system of claim 10, wherein the notification silencing mode comprises at least one of:
a do not disturb mode configured to silence all notifications received by the user device;
a flip to silence mode configured to silence all notifications received by the user device when the user device is in a face-down position; or
a focus mode configured to allow one or more predetermined notifications and silence all other notifications received by the user device.

* * * * *